(12) United States Patent
Lai

(10) Patent No.: US 7,699,332 B2
(45) Date of Patent: Apr. 20, 2010

(54) STEM ASSEMBLY FOR A BICYCLE

(75) Inventor: Wu-Shih Lai, Changhua Hsien (TW)

(73) Assignee: Chuhn-E Industries Co., Ltd., Yongsing Village, Yongjing Hsiang, Changhua Hsien (TW)

( * ) Notice: Subject to any disclaimer, the term of this patent is extended or adjusted under 35 U.S.C. 154(b) by 144 days.

(21) Appl. No.: 11/860,046

(22) Filed: Sep. 24, 2007

(65) Prior Publication Data

US 2009/0079160 A1 Mar. 26, 2009

(51) Int. Cl.
*B62K 21/16* (2006.01)
(52) U.S. Cl. .................. 280/279; 74/551.3; 403/110
(58) Field of Classification Search ............ 280/279, 280/280; 74/551.1, 551.3, 551.6, 551.7, 74/551.4; 403/86, 87, 110, 101
See application file for complete search history.

(56) References Cited

U.S. PATENT DOCUMENTS

| | | | | |
|---|---|---|---|---|
| 3,866,946 A | * | 2/1975 | Robison | 280/279 |
| 5,373,757 A | * | 12/1994 | Bigall | 74/551.3 |
| 5,860,728 A | * | 1/1999 | Maglica | 362/191 |
| 2003/0110880 A1 | * | 6/2003 | Tison et al. | 74/551.8 |
| 2007/0241531 A1 | * | 10/2007 | D'Aluisio et al. | 280/279 |
| 2009/0096185 A1 | * | 4/2009 | Wu et al. | 280/279 |

* cited by examiner

*Primary Examiner*—Anne Marie M Boehler
(74) *Attorney, Agent, or Firm*—patenttm.us

(57) ABSTRACT

A stem assembly for a bicycle has a body, a clamp and a connecting device. The body is connected to the bicycle between a head tube and a handlebar and has a handlebar mount and a fork mount having two smooth recesses. The clamp is mounted in the body and around the head tube and has two jaws. Each jaw is curved and has a convex hemisphere corresponding to the smooth recesses of the fork mount to allow an angle of the stem assembly to be adjusted. The connecting device is connected to the fork mount of the body and the clamp and the head tube and has a cap, a spacer and a fastener. The cap is mounted on the fork mount. The spacer is mounted on the cap. The fastener is presses against the spacer and is connected to the head tube.

7 Claims, 5 Drawing Sheets

STEM ASSEMBLY FOR A BICYCLE

BACKGROUND OF THE INVENTION

1. Field of the Invention

The present invention relates to a stem assembly, and more particularly to a stem assembly for a bicycle that can be adjusted smoothly and manufactured quickly.

2. Description of Related Art

A conventional stem assembly is mounted on a bicycle between a head tube and a handlebar and has a body, a handlebar mount, two engaging elements and a fastener.

The handlebar mount is mounted around the head tube and has an external surface, a connecting segment and a handlebar hole. The connecting segment is formed on and protrudes from the external surface of the handlebar mount. The handlebar hole is formed through the connecting segment.

The body is connected to the handlebar mount and the handlebar and has a proximal end, a distal end, two connecting panels and two bevel gear holes. The proximal end of the body is connected rotatably to the mounting handlebar mount. The distal end of the body is connected securely to the handlebar of the bicycle. The connecting panels are formed on and protrude from the proximal end parallel each other and are connected rotatably to the connecting segment of the mounting handlebar mount. The bevel gear holes are respectively formed through the connecting panels and align with the engaging hole in the connecting segment.

The engaging elements are connected to the mounting handlebar mount and the body and each engaging element has an inner end, an outer end, an engaging post and a head. The engaging post is formed on the inner end of the engaging element and extends through a corresponding bevel gear hole and engages with the engaging hole of the mounting handlebar mount. The head is formed on the outer end of the engaging element and has a bevel gear surface abutting with the bevel gear hole of a corresponding connecting panel of the body. The fastener is connected to the engaging elements to make the engaging elements pressing against the connecting panels and hold the body with the mounting handlebar mount.

However, the conventional stem assembly for a bicycle has the following shortcomings.

1. The conventional stem assembly although provides an adjustable effect to change an angle between the head tube and the handlebar, but the angle is restricted by the bevel gear holes and the bevel gear surfaces. Therefore, a person does not adjust the angle between the head tube and the handlebar smoothly.

2. The components and structure of the conventional stem assembly are numerous and complicated and this will increase the time and cost of manufacturing the conventional stem assembly.

To overcome the shortcomings, the present invention provides a stem assembly to mitigate or obviate the aforementioned problems.

SUMMARY OF THE INVENTION

The main objective of the present invention is to provide a stem assembly for a bicycle that can be adjusted smoothly and fabricated quickly.

The stem assembly for a bicycle in accordance with the present invention has a body, a clamp and a connecting device. The body is connected to the bicycle between a head tube and a handlebar and has a handlebar mount and a fork mount having two hemispherical smooth recesses. The clamp is mounted in the body and around the head tube and has two jaws. Each jaw is curved and has a convex hemisphere corresponding to the smooth recesses of the fork mount to allow an angle of the stem assembly to be adjusted. The connecting device is connected to the clamp and the head tube and has a cap, a spacer and a fastener. The cap is mounted on the fork mount. The spacer is mounted on the cap. The fastener presses against the spacer and is connected to the head tube.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
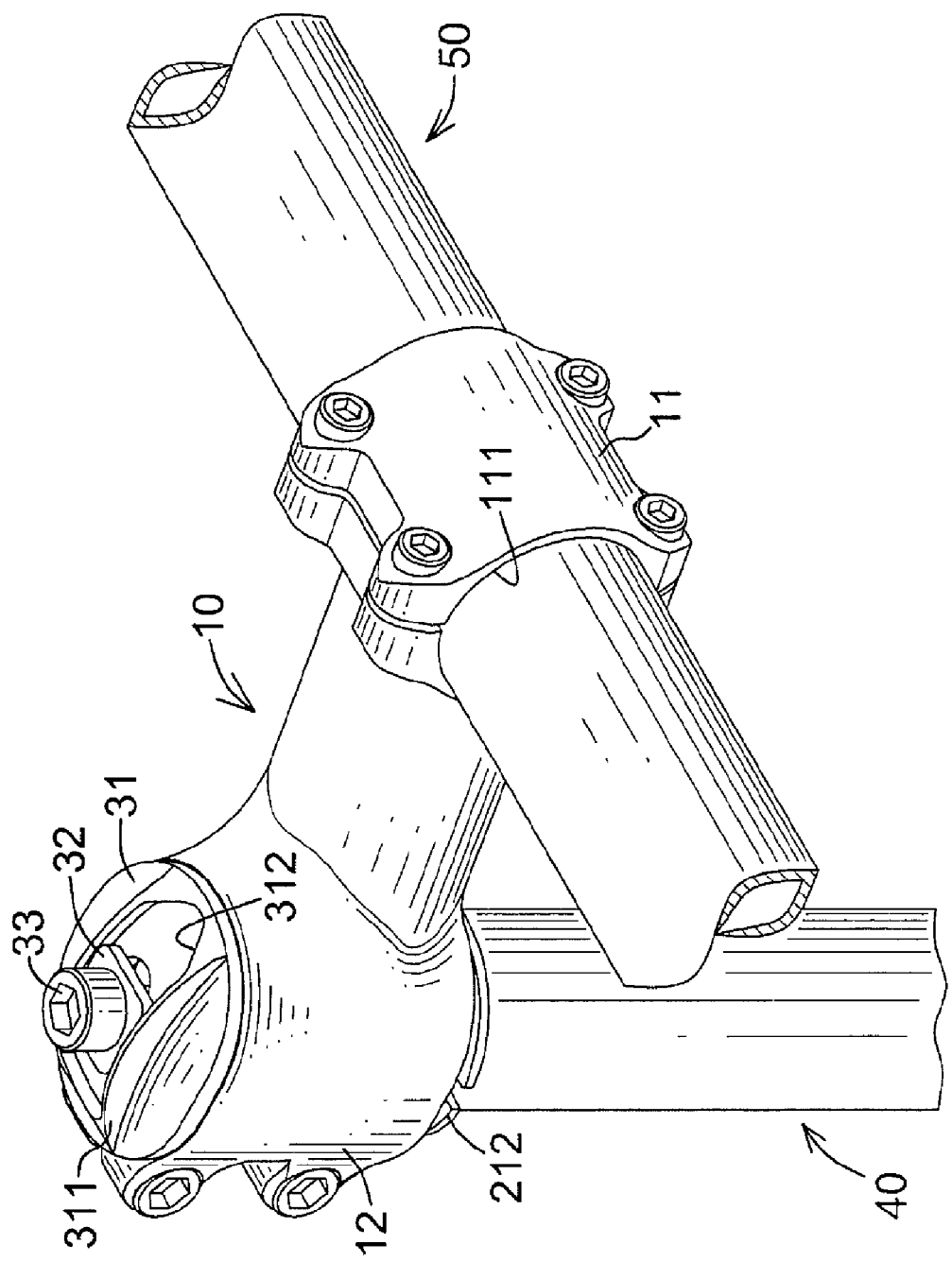
FIG. 1 is a perspective view of a stem assembly in accordance with the present invention that connected to a bicycle between a head tube and a handlebar.
Figure 2:
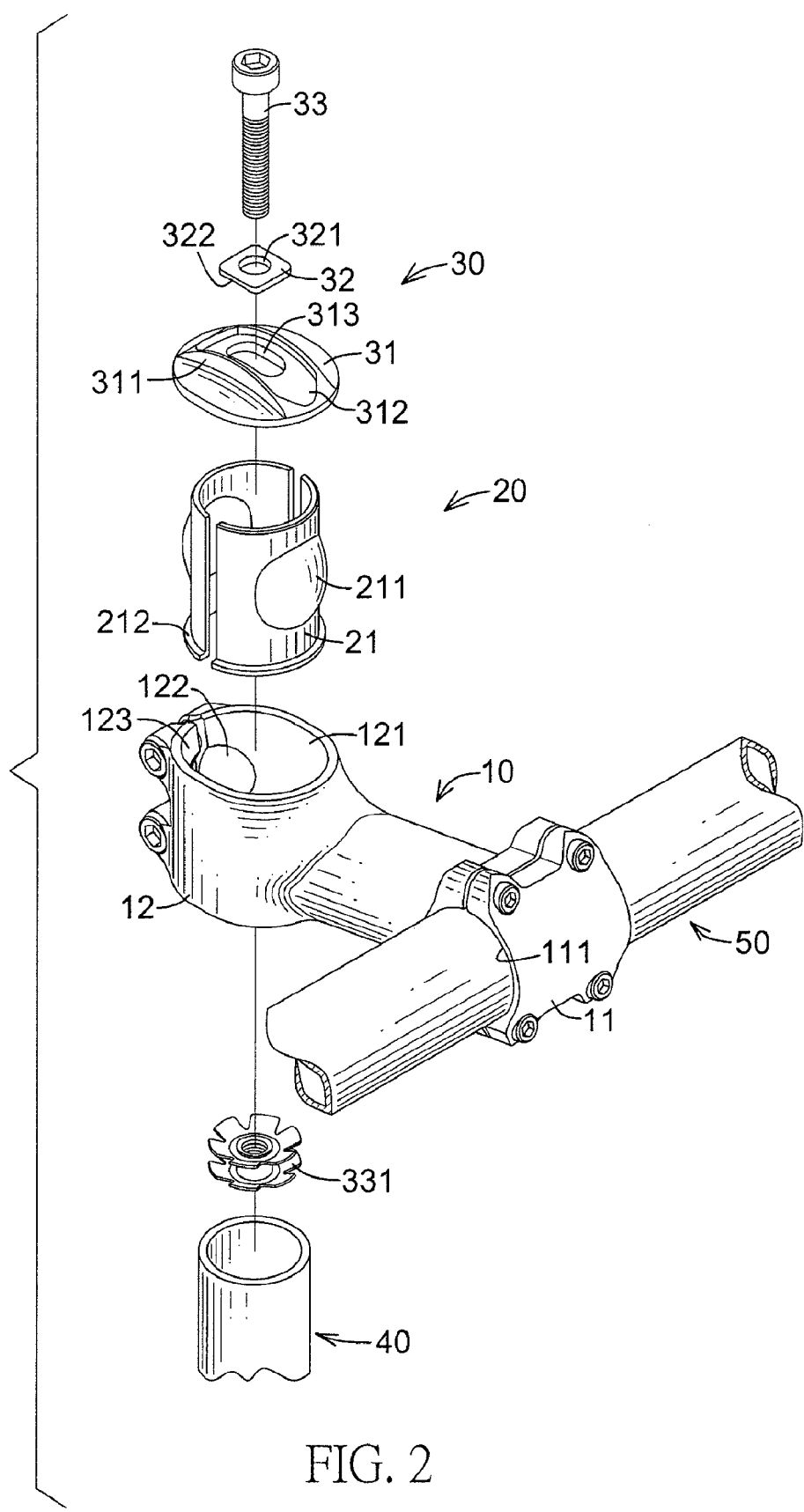
FIG. 2 is an exploded perspective view of the stem assembly in FIG. 1.
Figure 3:
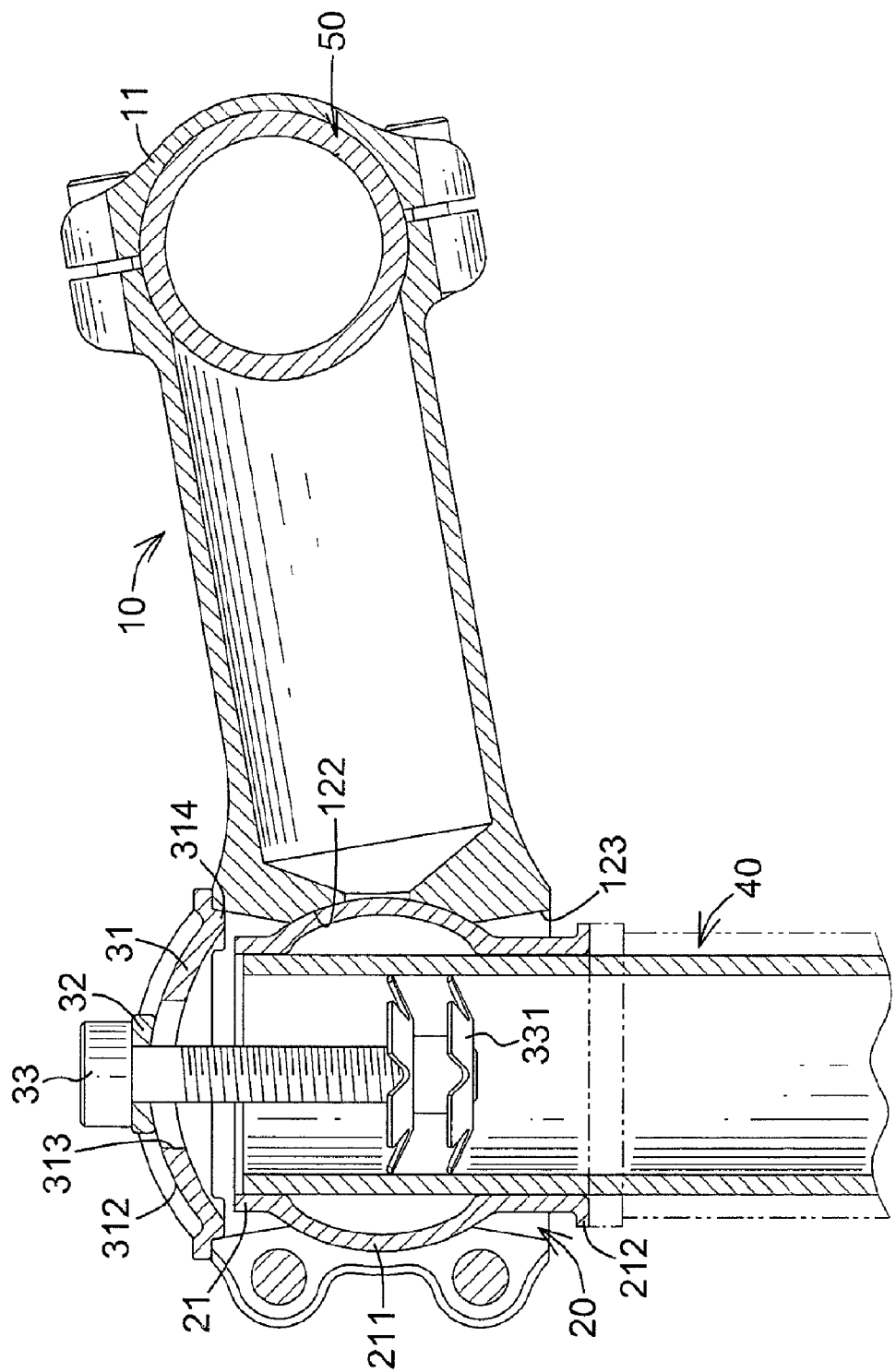
FIG. 3 is a side view in partial section of the stem assembly in FIG. 1.

With reference to FIGS. 1 to 3, a stem assembly for a bicycle in accordance with the present invention comprises a body (10), a clamp (20) and a connecting device (30).

The bicycle comprises a head tube (40) having an internal surface and a handlebar (50).

The body (10) is connected to the bicycle between the head tube (40) and the handlebar (50) and has a distal end, a proximal end, a handlebar mount (11) and a fork mount (12).

The handlebar mount (11) is formed on the distal end of the body (10) and is mounted securely around the handlebar (50) and has a handlebar hole (111). The handlebar hole (111) is formed transversely through the handlebar mount (11) and mounted around the handlebar (50).

The fork mount (12) is formed on the proximal end of the body (10) and is mounted around the head tube (40) and has an internal surface, a top end, a bottom end, a head tube hole (121), two smooth recesses (122) and two optional inclined limits (123). The head tube hole (121) is formed transversely through the fork mount (12) may be perpendicular to the handlebar hole (111) and is mounted around the head tube (40). The smooth recesses (122) are hemispherical, are formed in the internal surface or the fork mount (12) and face each other. The inclined limits (123) are formed annularly around the top end and the bottom end of the fork mount (12) respectively.

The clamp (20) is mounted around the head tube (40) inside the head tube hole (121) of the body (10) and has two jaws (21). The jaws (21) are mounted around the head tube (40) in the head tube hole (121) and each jaw (21) is curved corresponding to the internal surface of the fork mount (12) and has an external surface, a lower end, a convex hemisphere (211) and an optional flange (212). The convex hemisphere (211) is formed on and protrudes from the external surface of the jaw (21) and is mounted movably in and abuts the corresponding smooth recess (122) in the fork mount (12). The flange (212) is formed on the lower end of the jaw (21) and may press against the bicycle.

The connecting device (30) is connected to the fork mount (12) of the body (10) and the clamp (20) and the head tube (40) and has a cap (31), a spacer (32) and a fastener (33).

The cap (31) is mounted on the fork mount (12) of the body (10) and has a top, a bottom, an optional curved protrusion (311), an optional elongated recess (312), an optional elongated hole (313) and two optional limit blocks (314). The curved protrusion (311) is formed on the top of the cap (31). The elongated recess (312) is formed in the curved protrusion (311) of the cap (31) and has a curved bottom. The elongated hole (313) is formed through the bottom of the cap (31) and communicates with the elongated recess (312). The limit blocks (314) are formed on the bottom of the cap (31) beside the elongated hole (313) and selectively abut the inclined limit (123) in the top end of the fork mount (12).

The spacer (32) is mounted on the cap (31), may be in the elongated recess (312) and has a bottom, an optional through hole (321) and an optional curved surface (322). The through hole (321) is formed through the spacer (32) and communicates with the elongated hole (313) in the cap (31). The curved surface (322) is formed on the bottom of the spacer (32) and corresponds to the curved bottom of the elongated recess (312).

The fastener (33) presses against the spacer (32) and extends through the spacer (32) and the cap (31) and in the body (10) and abuts the head tube (40) and has an inner end and a disk-nut (331). The inner end of the fastener (33) extends through the through hole (321) of the spacer (32) and the elongated hole (313) of the cap (31) and into the head tube (40). The disk-nut (331) engages the internal surface of the head tube (40) and is threaded corresponding to the inner end of the fastener (33) and holds the cap (31) and the spacer (32) with the fork mount (12).

Figure 4:
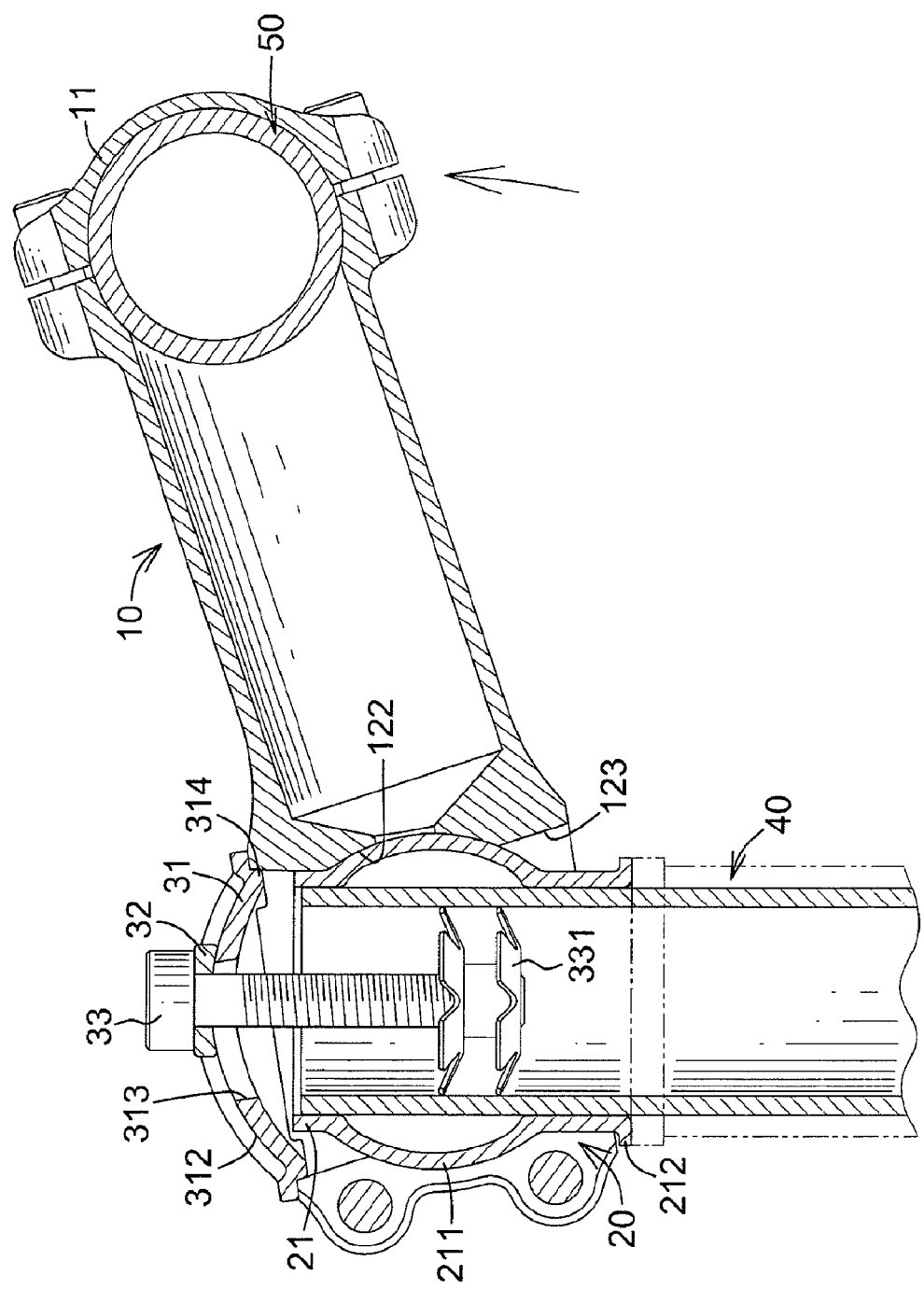
FIG. 4 is an operational side view in partial section of the stem assembly in FIG. 1.
Figure 5:
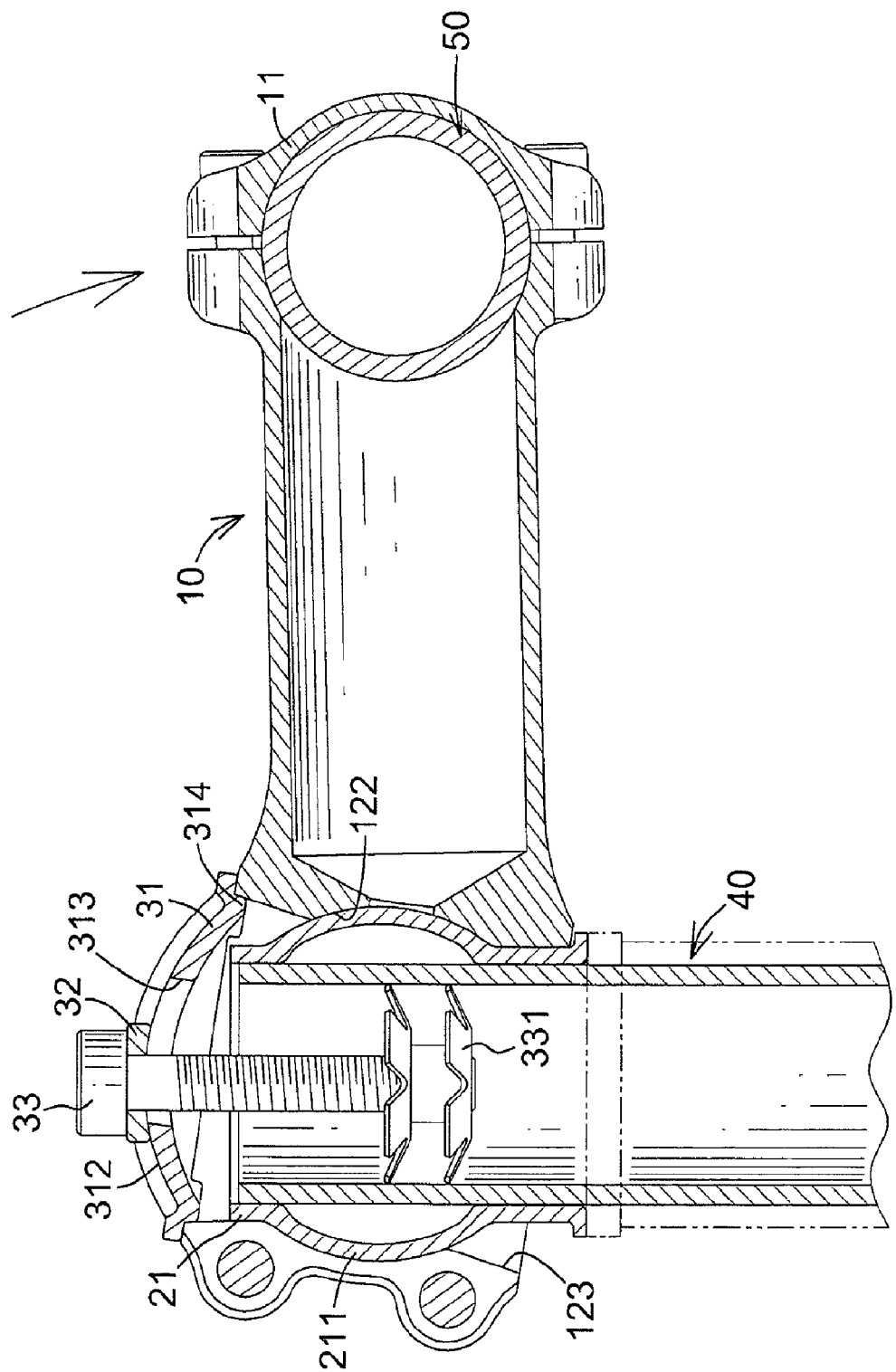
FIG. 5 is another operational side view of the stem assembly in FIG. 1.

With further reference to FIGS. 4 and 5, a person can adjust an angle between the head tube (40) and the handlebar (50) by loosing the fastener (33). Then, the fork mount (12) of the body (10) is slid up or down relative to the head tube (40) since the smooth recesses (122) slide relative to the convex hemispheres (211). After adjusting the angle between the head tube (40) and the handlebar (50), the person secures the stem assembly easily and quickly by fastening the fastener (33).

The stem assembly for a bicycle as described has the following advantages.

1. The angle of the stem assembly in accordance with the present invention is adjusted since the smooth recesses (122) of the fork mount (12) slide relative to the convex hemisphere (211) or the jaws (21). Then, the person adjusts the angle between the head tube (40) and the handlebar (50) smoothly.

2. Components and structure of the stem assembly are simple thereby reducing time, cost and complexity of manufacture.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stem assembly for a bicycle comprising
    a body having
        a distal end;
        a proximal end;
        a handlebar mount being formed on the distal end of the body and having a handlebar hole being formed transversely through the handlebar mount; and
        a fork mount being formed on the proximal end of the body and having
            an internal surface;
            a top end;
            a bottom end;
            a head tube hole being formed transversely through the fork mount; and
            two smooth recesses being hemispherical, being formed in the internal surface of the fork mount and facing each other;
    a clamp being mounted inside the head tube hole of the body and having
        two jaws being mounted in the head tube hole and each jaw being curved corresponding to the internal surface of the fork mount and having
            an external surface;
            a lower end; and
            a convex hemisphere being formed on and protruding from the external surface of the jaw and being mounted moveably in and abutting a corresponding smooth recess in the fork mount; and
    a connecting device being connected to the fork mount of the body and the clamp and having
        a cap being mounted on the fork mount of the body;
        a spacer being mounted on the cap; and
        a fastener pressing against the spacer and extending through the spacer, the cap and in the body.

2. The bicycle stem assembly as claimed in claim 1, wherein
    the cap further has
        a top;
        a bottom;
        a curved protrusion being formed on the top of the cap;
        an elongated recess being formed in the curved protrusion of the cap and having a curved bottom;
        an elongated hole being formed through the bottom of the cap and communicating with the elongated recess;
    the spacer is mounted in the elongated recess and further has a through hole being formed through the spacer and communicating with the elongated hole in the cap; and
    the fastener extends through the through hole of the spacer and the elongated hole of the cap.

3. The bicycle stem assembly as claimed in claim 2, wherein the fastener further has
    an inner end extending through the through hole of the spacer and the elongated hole of the cap; and
    a disk-nut being threaded corresponding to the inner end of the fastener.

4. The bicycle stem assembly as claimed in claim 3, wherein
    the fork mount further has two inclined limits being formed annularly around the top end and the bottom end of the fork mount respectively; and
    the cap further has two limit blocks being formed on the bottom of the cap beside the elongated hole and selectively abutting the inclined limit in the top end of the fork mount.

5. The bicycle stem assembly as claimed in claim 4, wherein the spacer further has a curved surface being formed on the bottom of the spacer and corresponding to the curved bottom of the elongated recess.

6. The bicycle stem assembly as claimed in claim 5, wherein each jaw further has a flange being formed on the lower end of the jaw.

7. The bicycle stem assembly as claimed in claim 1, wherein each jaw further has a flange being formed on the lower end of the jaw.

* * * * *